United States Patent [19]

Odaka et al.

[11] Patent Number: 5,067,131

[45] Date of Patent: Nov. 19, 1991

[54] APPARATUS AND METHOD FOR RECORDING AND/OR REPRODUCING A DIGITAL SIGNAL

[75] Inventors: Kentaro Odaka, Tokyo; Shinya Ozaki, Kanagawa; Yoshizumi Inazawa, Kanagawa; Masaki Yamada, Kanagawa; Hiroshi Ishibashi, Kanagawa; Tatsuya Iijima, Kanagawa, all of Japan

[73] Assignee: Sony Corporation, Tokyo, Japan

[21] Appl. No.: 529,884

[22] Filed: May 25, 1990

Related U.S. Application Data

[62] Division of Ser. No. 262,487, Oct. 25, 1988.

[30] Foreign Application Priority Data

Oct. 27, 1987 [JP] Japan .................................. 62-270531
Dec. 14, 1987 [JP] Japan .................................. 62-315789

[51] Int. Cl.$^5$ .......................................... H03M 13/00
[52] U.S. Cl. ............................................... 371/40.1
[58] Field of Search ..................... 371/40.4, 39.1, 40.1

[56] References Cited

U.S. PATENT DOCUMENTS

| | | | |
|---|---|---|---|
| 4,282,551 | 8/1981 | Kanazawa et al. | 371/40.1 |
| 4,499,507 | 2/1985 | Yamada et al. | 360/51 |
| 4,696,008 | 9/1987 | Takei et al. | |
| 4,796,110 | 1/1989 | Glass et al. | 371/40.1 |
| 4,876,616 | 10/1989 | Katsumata et al. | 360/53 |
| 4,916,554 | 4/1990 | Takahashi et al. | 360/10.2 |
| 4,953,035 | 8/1990 | Yoshio | 358/335 |

FOREIGN PATENT DOCUMENTS

0257991 3/1988 European Pat. Off. .
0297809 4/1989 European Pat. Off. .

OTHER PUBLICATIONS

Patent Abstracts of Japan, vol. 9, No. 33 (P-334)[1756], Feb. 13, 1985; and JP-A-59 177 705 (Fujitsu K.K.).

IBM Techical Disclosure Bulletin, vol. 25, No. 2, Jul. 1982, pp. 819, 820, New York, U.S.A.; S. M. Fry et al.: "Record Block Number Checking".

*Primary Examiner*—Jerry Smith
*Assistant Examiner*—Phung M. Chung
*Attorney, Agent, or Firm*—Philip M. Shaw, Jr.

[57] ABSTRACT

An apparatus and method for recording and/or reproducing digital data employing a DAT (digitial audio tape recorder) adapted to record and/or reproduce data from a computer or the like in accordance with the DAT format. Main data is recorded in a main area of a track while error detecting data for the main data recorded in the main area of the track is recorded in a sub-area of the track to thereby easily detect an error in the main data.

14 Claims, 7 Drawing Sheets

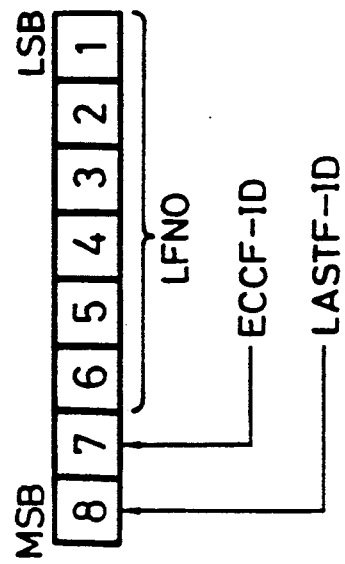
FIG. 5
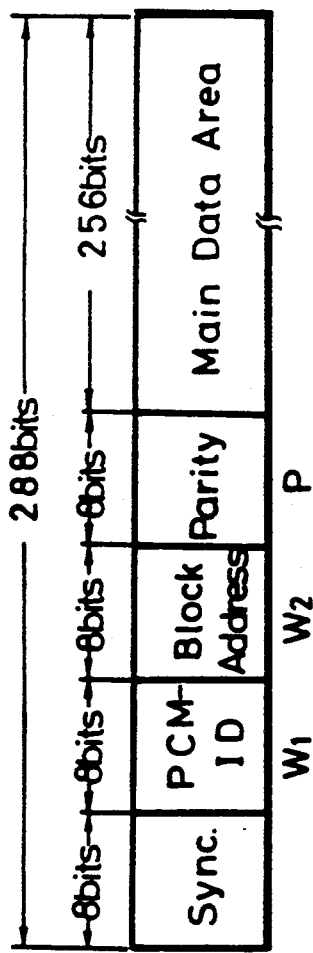
FIG. 3
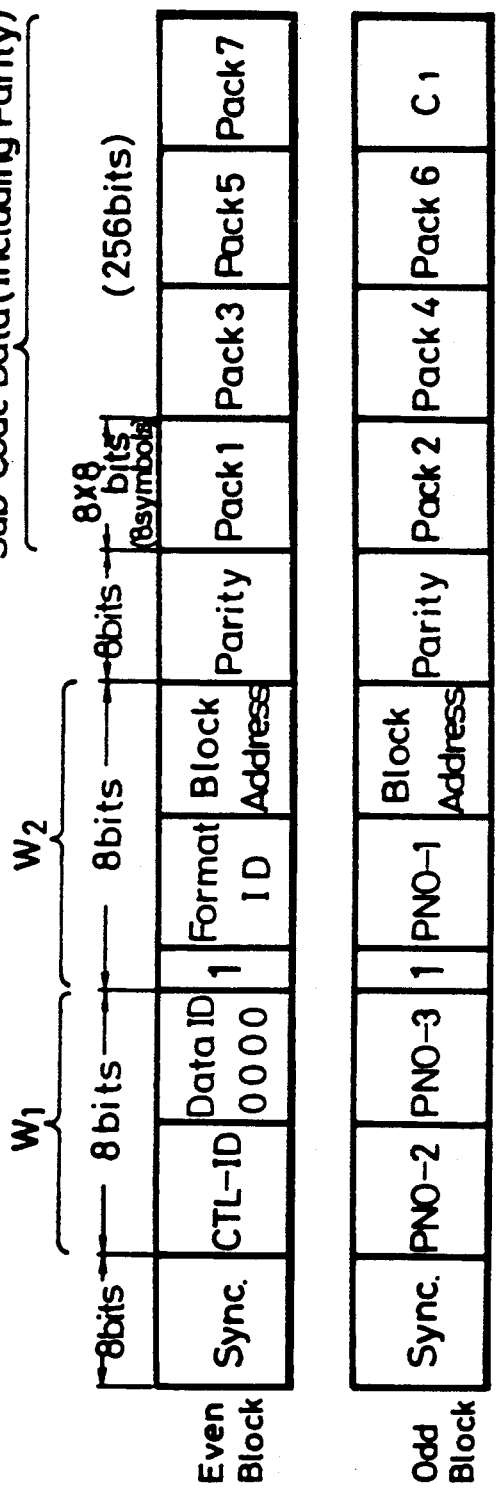
FIG. 6A
FIG. 6B

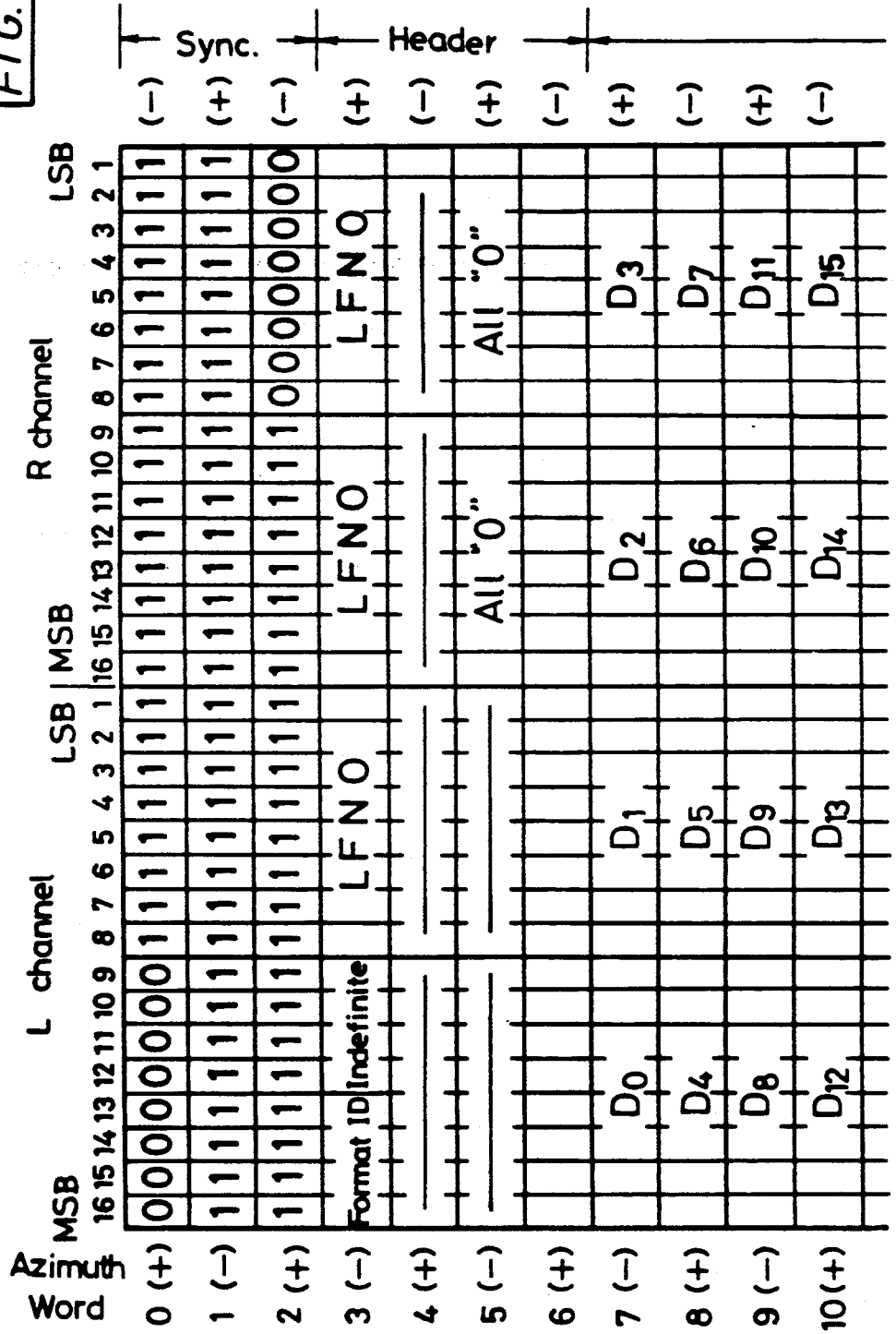

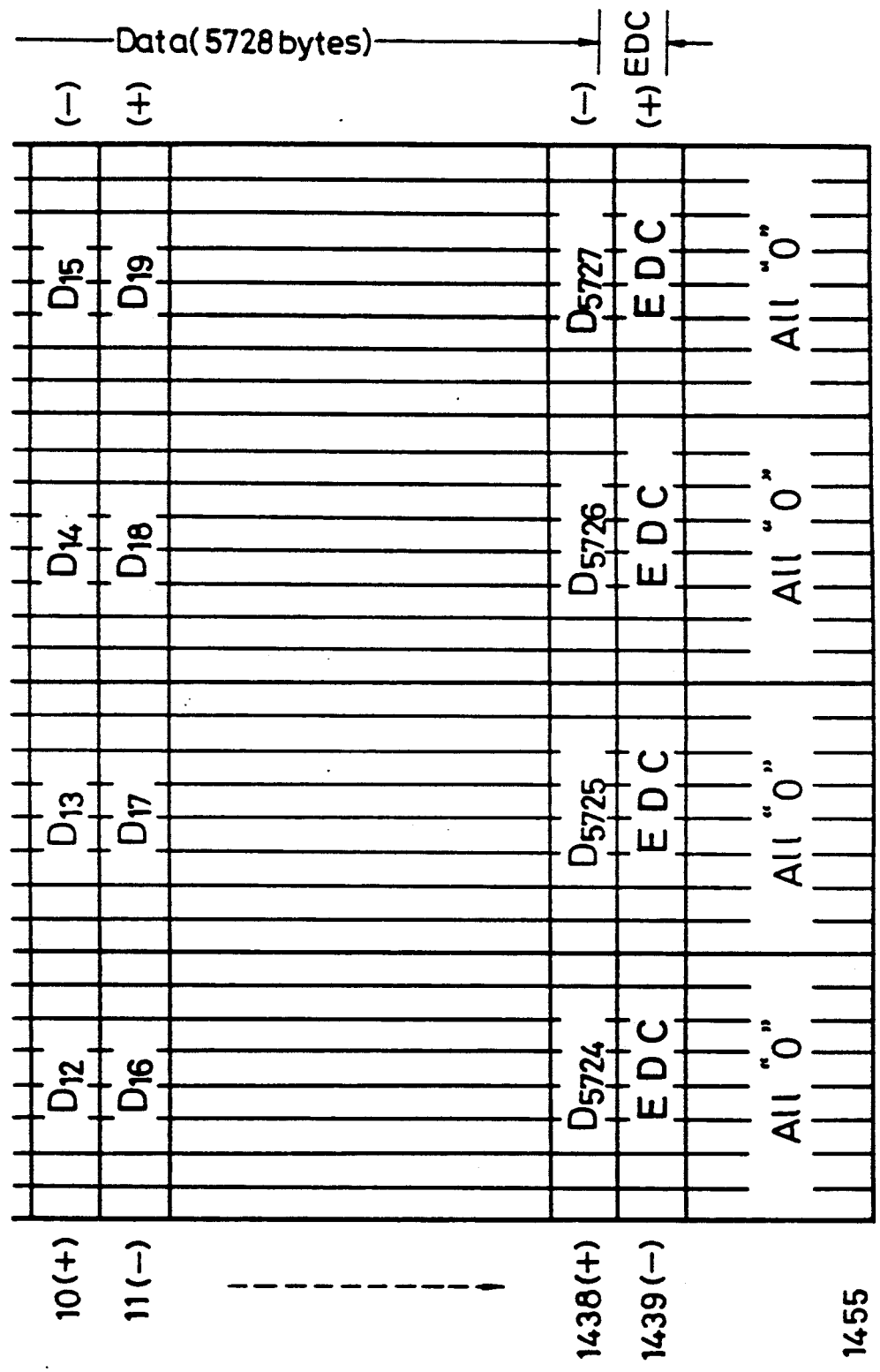

FIG. 7

| | MSB | | | | | LSB |
|---|---|---|---|---|---|---|
| PC1 | 0 | 0 | 1 | 1 Pack No. | | Format ID |
| PC2 | Indefinite | | | | | |
| PC3 | Area ID | | | | AFNO(MSB) | |
| PC4 | AFNO | | | | | |
| PC5 | AFNO(LSB) | | | | | |
| PC6 | CD (Check Data)(MSB) | | | | | |
| PC7 | CD (LSB) | | | | | |
| PC8 | Parity | | | | | |

FIG. 9

| | | Continuity of AFNO | |
|---|---|---|---|
| | | OK | NG |
| Check Data | OK | (1) | (2) |
| | NG | (3) | (4) |

FIG. 10

| | A | B | C |
|---|---|---|---|
| (1) | Main Data OK | Error Main Data Drop-in | Error Main Data Drop-out |
| (2) | Error Main & Subdata Drop-in | do. | do. |
| (3) | Error Main Data Drop-in | do. | do. |
| (4) | Main Data OK Subdata Drop-in | do. | do. |
| (5) | Main Data OK Subdata Drop-out | do. | do. |

APPARATUS AND METHOD FOR RECORDING AND/OR REPRODUCING A DIGITAL SIGNAL

This is a divisional of application Ser. No. 262,487, filed Oct. 25, 1988.

BACKGROUND OF THE INVENTION

1. Field of the Invention

The present invention relates to an apparatus and method for recording and/or reproducing a digital signal, and more particularly to such an apparatus and method suitable for use in recording and/or reproducing a digital signal transferred from a computer or the like.

2. Description of the Prior Art

In practice, data stored in a hard disk or the like of a computer may be transferred to and recorded by a data streamer (data-recorder) once a day so as to protect the data or back up the same.

For this operation, or as a data recorder, analog audio tape recorders have been conventionally used in many cases. However, analog tape recorders have disadvantages in that they need an excessive amount of a recording medium or magnetic tape for recording and operate at a quite low data transferring rate upon recording, so that it takes too much time to transfer and record such data information. Moreover, analog tape recorders have problems, e.g. the starting point of a desired portion of the recorded data information cannot be rapidly searched for, and so on.

Thus, to overcome the above-mentioned problems, it is thought to utilize a helical-scan type DAT (digital audio tape recorder) using a rotary head, that is, a so-called recently commercialized DAT as a data recorder. Such data recorders utilizing a DAT are described in U.S. patent applications Ser. Nos. 133,010 filed Dec. 15, 1987, No. 177,624 filed Apr. 5, 1988, No. 210,229 filed June 23, 1988 and No. 220,028 filed July 15, 1988, by the same assignee of the present application.

To utilize the DAT as a data recorder, data transferred from a host computer is transformed in accordance with a DAT format before recording. In the DAT format, one frame is made up of two oblique tracks formed by one rotation of two heads each having a different azimuth angle with respect to the tape. 16-bit PCM audio data, which has been interleaved, and auxiliary sub-data are recorded in this one frame area as a unit. During recording, there are formed in each track a main area for recording the PCM data and a sub-area for recording the sub-data.

With the DAT as described above, when another signal is to be recorded on a previously recorded recording medium or tape, previously recorded signals are erased by recording new signals thereover, that is, by a so-called overwriting, without using an erasing head. Therefore, if overwriting is not normally effected, for example, due to clogging of the head or the like, there is the possibility that a part of the previously recorded signals may remain unerased. Also, if the tape loses contact with the heads for an instant previously recorded signals may remain unerased. Either problem causes a data error referred to as "drop-in".

To avoid this data error, in the DAT format, an error detecting code is added to each of the main area and the sub-area of each track in which signals are recorded, so as to detect an unerased portion, if any, in the track as an error.

In the DAT format as described above, the main area and the sub-area of one track are respectively provided with the error detecting code so that the drop-in can be detected in the concerned area. However, even though such an error detecting code is added, in the event that previously recorded signals in an entire main area or an entire sub-area remain unerased, the drop-in cannot be detected if the error detecting code in the concerned area is considered to be normal.

If a signal to be recorded is an audio signal, signals remaining in the unerased portion can be removed by positional correlation or the like. However, when the DAT is utilized as a data recorder, there is generally no positional correlation of data. Moreover, when the DAT is used as a data recorder, it is required to record and reproduce data more exactly than for audio signals.

OBJECTS AND SUMMARY OF THE INVENTION

Accordingly, it is an object of the present invention to provide an apparatus and method for recording and/or reproducing a digital signal which is capable of solving the above-mentioned problems.

According to a first aspect of the present invention, there is provided an apparatus for recording a digital signal in a track formed on a recording medium, comprising:

means for forming a main area for recording main data and a sub-area for recording sub-data in said track; and means for recording in the sub-area, check data for detecting an error in data recorded in the main area.

According to a second aspect of the present invention, there is provided an apparatus for reproducing a digital signal recorded by the above described apparatus including:

means for reproducing the signals recorded in the tracks;

means for extracting the check data recorded in the sub-area from the reproduced signals; and means for comparing the extracted check data and the reproduced main data to detect an error in the main data.

According to a third aspect of the present invention, pairs of tracks are considered one frame and the data is organized according to logical frame numbers and absolute frame numbers. The means for comparing the reproduced check data and the reproduced main data includes means for detecting the continuities of the logical and absolute frame numbers.

The above and other objects, features and advantages of the present invention will become apparent from the following detailed description of the preferred embodiment taken in conjunction with the accompanying drawings, throughout which like reference numerals designate like elements and parts.

BRIEF DESCRIPTION OF THE DRAWINGS

FIG. 3 is a diagram showing the data arrangement in a main data block;

FIGS. 4A and 4B are a diagram showing the data arrangement of the main area in one frame;

FIG. 5 is a diagram showing the data arrangement of the logical frame number;

FIGS. 6A and 6B together are a diagram showing the data arrangement of a sub-code block;

FIG. 7 is a diagram showing the data arrangement of the packs in the sub-code block;

FIG. 9 is a table showing error determination bases; and

FIG. 10 is a table showing the contents of the respective determinations.

DETAILED DESCRIPTION OF THE PREFERRED EMBODIMENT

One embodiment of the present invention will now be described with reference to the accompanying drawings.

Figure 1:
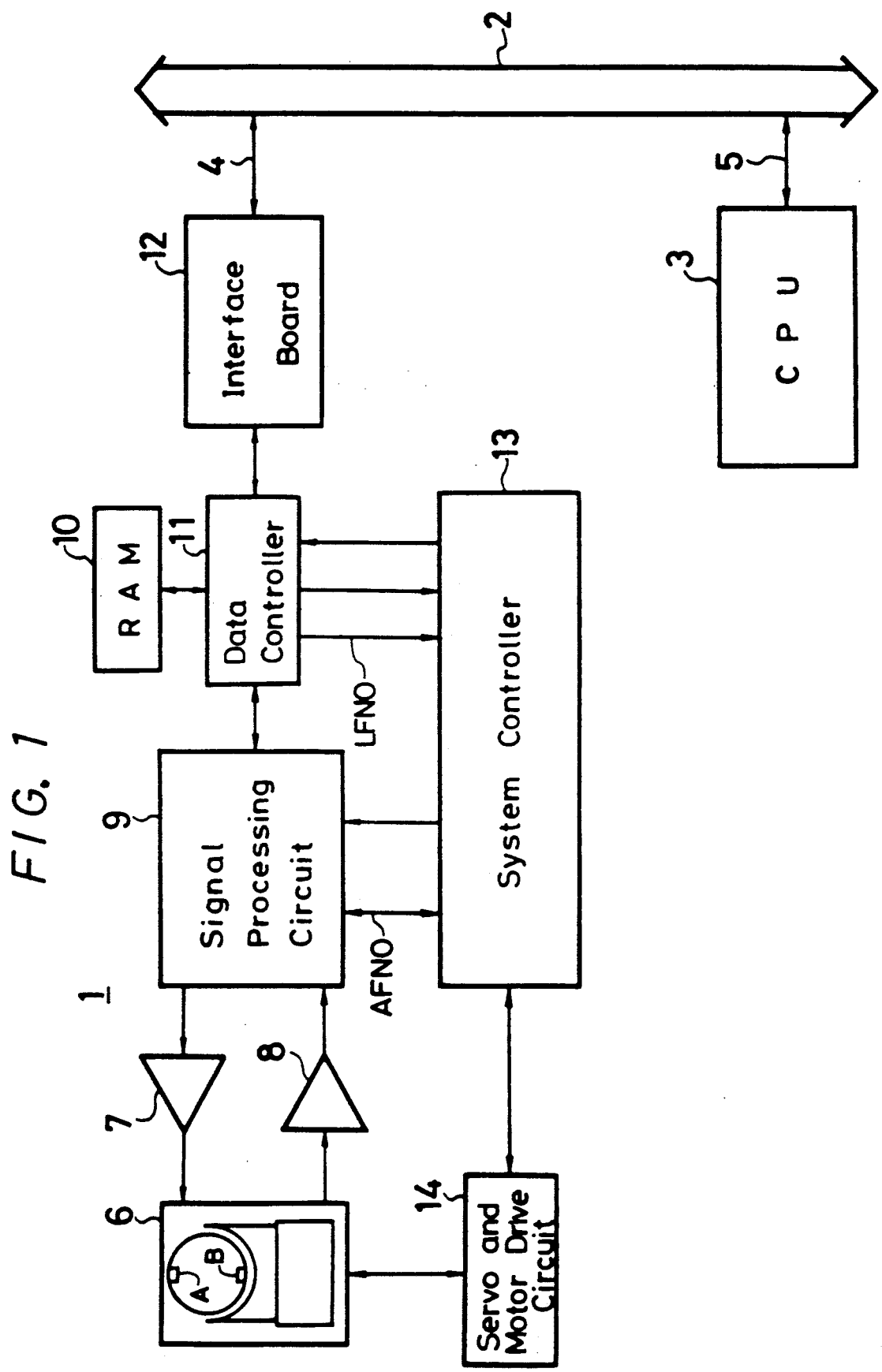
FIG. 1 is a block diagram showing an embodiment of the present invention.

FIG. 1 shows the whole arrangement of an embodiment according to the present invention in which a DAT is used as a data recorder. In FIG. 1 reference numeral 1 generally designates a DAT, 2 an interface bus, 3 a host computer and 4 and 5 inner buses, respectively. The DAT 1 is mainly formed of a recording and reproducing section 6, a recording amplifier 7, a reproducing amplifier 8, a signal processing circuit 9, a RAM 10, a data controller 11, an interface board 12, a system controller 13, a servo and motor drive circuit 14 and so on.

The system controller 13, the signal processing circuit 9 and the data controller 11 are arranged to interchange among them predetermined signals such as an absolute frame number AFNO, check data, a mode indication, a logical frame number LFNO, a determination result by the check data, a data transfer instruction and so on.

The recording and reproducing section 6 is provided with a rotary head drum, though not shown, such that a magnetic tape 15 (FIG. 2) is wrapped around the peripheral surface of the drum over an angular range of about 90° of head travel and transported by a capstan. The drum is provided with a pair of heads A and B mounted thereon respectively having azimuth angles different from each other, in a manner such that two oblique tracks are recorded on and reproduced from the tape by the heads with each rotation of the drum.

Digital data delivered from the host computer 3 through the buses 5, 2 and 4 is fed to the interface board 12 through which the digital data is subjected to predetermined signal processing in the data controller 11, the RAM 10, the signal processing circuit 9, and so on, under the control of the system controller 13 to be converted in accordance with aforementioned DAT format. The DAT formatted data is then supplied through the recording amplifier 7 to the recording and reproducing section 6 to be recorded on the magnetic tape by the heads A and B.

The signal recorded on the magnetic tape can be subsequently reproduced by the heads A and B. The reproduced signal is supplied through the reproducing amplifier 8 to the signal processing circuit 9 wherein the signal is re-converted from the DAT format. The digital data therefrom is supplied through the data controller 11, the interface board 12 and the buses 4, 2 and 5 to the host computer 3.

Figure 2:
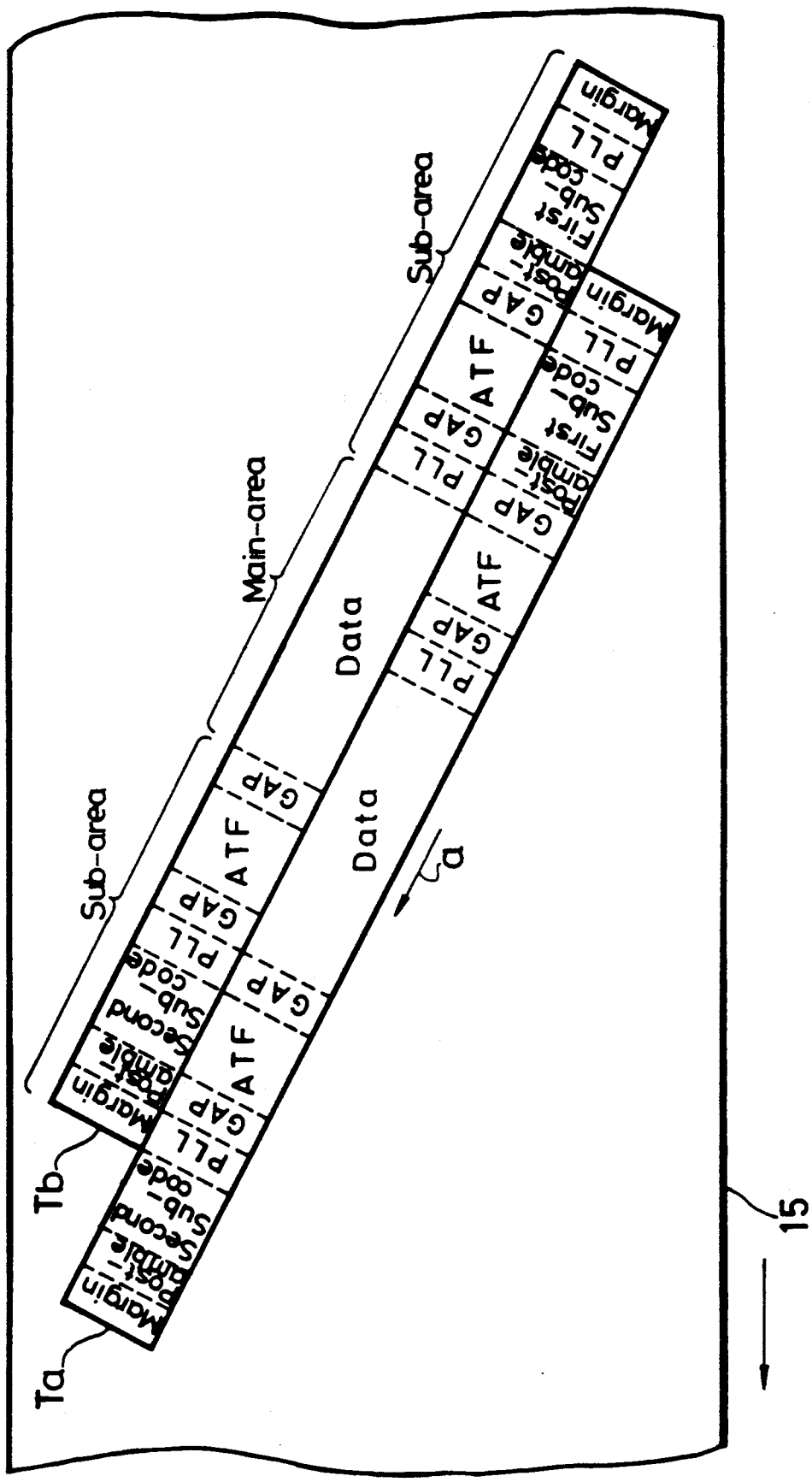
FIG. 2 is a diagram showing a DAT format.

In the above-mentioned apparatus, the DAT format according to which signals are recorded on a magnetic tape is as shown in FIG. 2.

In FIG. 2, two oblique tracks $T_A$ and $T_B$ are formed on a tape 15 by one rotation of the heads A and B, as indicated by an arrow a in FIG. 2. One frame is made up of these two tracks $T_A$ and $T_B$. One track $T_A$ or $T_B$ comprises 196 blocks and one block is formed of 288 bits. At each end portion thereof 34 blocks are assigned to be the sub-areas and 128 blocks of the central portion thereof constitute the main area.

The sub-areas are further divided into several areas. Specifically, beginning from the lower end side of each sub-area, as viewed in FIG. 2, the first sub-areas of the tracks $T_A$ and $T_B$ are partitioned into a margin area, a preamble area for the PLL of the sub-code, a first sub-code area, a postamble area, an interblock gap area, a tracking (ATF) signal area, another interblock gap area, and a preamble area for the PLL of data. The second sub-areas, at the other ends of the tracks $T_A$ and $T_B$ are partitioned into an interblock gap area, an ATF signal area, another interblock gap area, a preamble area for the PLL of the sub-code area, a second sub-code area, a postamble area, and a margin area. Among these areas, the first and second sub-code areas are respectively formed of eight blocks, and the other areas are formed of a predetermined number of blocks. It should be noted that the scale of the respective areas in FIG. 4 is not exact.

The main area comprises 128 data blocks. Each of the blocks thereof comprises, as shown in FIG. 3, from its head (the left side as viewed in FIG. 3), eight bits each of a synchronizing signal, a $W_1$ area for recording the PCM-ID and so on, a block address area and a parity area and the remaining 256 bits of a main data area. When an audio signal is recorded, the main data area is loaded with a left (L) channel and a right (R) channel, each comprising 16 bit PCM data. The 16-bit PCM data are interleaved and recorded with parities in the main areas of the two tracks $T_A$ and $T_B$ (one frame). Thus, the main areas of one frame have a data capacity of approximately 5760 bytes.

When the DAT is employed as a data recorder the data transferred from the host computer 3 is converted into 16-bit data so as to be treated in the same manner as the above-mentioned audio PCM data and arranged in accordance with the format as shown in FIG. 4 and recorded in the main areas of one frame.

The above format will be explained in more detail. In FIGS. 4A and 4B, the above-mentioned 5760 bytes are divided into words (numbered 0–1439) each formed of four bytes (32 bits). Each of these words is divided into an R-channel and L-channel of 16-bits each (two bytes) in accordance with the DAT-formatted audio signal. The first three words (12 bytes) are assigned to be a synchronizing area in which all the bits of the first byte are set to "0", all the bits of the subsequent 10 bytes are set to "1", and all the bits of the last byte are set to "0".

Next, four words (16 bytes) are assigned to a header portion in which the same contents are written in the L-channel and R-channel portions. Specifically, explaining the arrangement of the header portion, the beginning half byte of the fourth word (note that the fourth word is referenced "3(−)," the fifth word is referenced "4(+)," etc.) of the L-channel in this header portion is assigned to be a format ID for indicating the format of the data recorder The 4 bits in the last half of the first byte of the fourth word are indefinite. The remaining three bytes of the fourth word are assigned to be logical frame number (LFNO) areas. By means of the LFNO, each being made of 8 bits, there is provided a binary value which is indicative of the serial number (1-23) of a frame, with 23 frames being treated as a unit.

The eighth to 1439th words subsequent to the header portion are assigned to be a data area having a total capacity of 5728 bytes, and data signals from the host computer 3 are sequentially recorded in these frames four bytes at a time.

The 1440th word is assigned to an error detecting code (EDC) area in which is recorded an error detecting code (EDC) for each of the data bit sequences formed in the vertical direction of the data signals written in the header portion and the data area.

As described above, the DAT format of the present embodiment is such that L-channel data and R-channel data are alternately recorded in two byte increments in two tracks, wherein each track is generally identified, for example, by plus and minus (+ and −) azimuth angles of the heads A and B for forming the tracks which are marked on the both sides of FIGS. 4A and 4B. The EDC can be generated for the two tracks forming one frame in the above-mentioned manner so that the EDC is generated for the data sequence formed of the data signals in the header portion and the data area in the vertical direction.

Therefore, according to this format, it is possible to determine whether there remain unerased portions or not by effecting the EDC operation. Specifically, if an unerased portion remains in one of the two tracks, all the other data for generating the EDC is erroneous so that the EDC cannot be generated correctly. Thus, the unerased portion can be detected by checking the generated EDC values.

Next, the logical frame number LFNO will be explained with reference to FIG. 5.

As described above, the logical frame number LFNO is assigned to record the serial numbers (1-23) of each frame, for example, with 23 frames being taken as a unit. In other words, the frame numbers 1 to 23 repeat at every 23 frames. As illustrated in FIG. 5, the LFNO is formed of eight bits. The most significant bit of the LFNO is a last frame ID (LASTF-ID) indicative of the last frame in the unit, that is, the 23rd frame when the unit is formed of 23 frames. The next most significant bit is an ECC frame ID (ECCF-ID) indicative of an error correcting code (ECC) frame for correcting errors. The remaining six bits represent the LFNO 1-23 in binary combination. The number of frames in one unit can be selected arbitrarily from the range of 1 to 64 in place of the above-mentioned 23 frames. In such case the last frame in one unit can be identified by the LASTF-ID. The ECCF-ID can be recorded in a plurality of frames, instead of recorded only in one frame.

The use of such a frame unit provided with the LFNOs can clearly delimit data of a predetermined quantity, and accordingly signal processing is facilitated. Further, since the number of frames in one unit can be appropriately selected by changing the maximum value of the LFNO, signal processing can be effected more easily.

Next, an explanation will be given of the data arrangement of the first and second sub-code portions in the sub-area.

The first and second sub-code portions are respectively formed of eight sub-code blocks in each of which 2048 bits of data can be recorded.

FIGS. 6A and 6B show, respectively, the constructions of the even-numbered sub-code block (EVEN block) and the odd-numbered sub-code block (ODD block), in each of which a synchronizing signal, the areas $W_1$ and $W_2$ and a parity, respectively formed of eight bits, and 256 bits of sub-code data including a parity are located in this order. The sub-code data is divided into four packs formed of 64 ($8 \times 8$) bits (eight symbols), respectively.

As shown in FIGS. 6A and 6B, the contents of $W_1$ and $W_2$ in the EVEN block are different from those in the ODD block, and the packs in the EVEN and ODD blocks are alternately numbered from "1" to "7". The eighth pack is assigned to record an error detecting code $C_1$.

In the EVEN block, the area $W_1$ consists of a four-bit control code (CTL-ID) and another four bits all set at "0", while the area $W_2$ consists of an upper bit set at "1", a three-bit format ID and a four-bit block address. On the other hand, in the ODD block, the area $W_1$ consists of program number codes (PNO-2 and PNO-3) respectively formed of four bits, while the area $W_2$ consists of an upper bit set at "1", a three-bit program number code (PNO-1) and a four-bit block address.

The packs 1-7 are respectively divided into eight words of eight bits each in which are recorded a variety of codes such as a code indicating the lead-in area of the record starting portion on a tape, a code indicating a lead-out area of the record terminating portion, a code indicating the recording date, an absolute frame number, a logical frame number and so on, with parities.

FIG. 7 shows the construction of the pack 3 as an example of one of these seven packs.

As can be seen from FIG. 7, the pack 3 consists of eight, eight-bit words PC1-PC8. The upper four bits of the word PCI are assigned to record a pack number ("0011" indicating the pack 3 in FIG. 7), and the lower four bits of the same are assigned a format ID. The word PC2 is indefinite. The upper four bits of the word PC3 are assigned to record an area ID indicative of the lead-in area or the lead-out area. A total 20 bit area formed of the lower four bits of the word PC3 and the words PC4 and PC5 is assigned to record the absolute frame number (AFNO) The AFNO is the serial number recorded in each corresponding frame in one volume of tape. A total 16-bit area formed of the subsequent words PC6 and PC7 is assigned to record a check data CD which relates to the present invention. The word PC8 is assigned to record a parity for the words PC1-PC7.

The above 16-bit check data CD is the exclusive OR of all the data (transferred from the host computer 3) recorded in the main area located in one of the tracks $T_A$ and $T_B$ in which the pack 3 is provided. Alternatively, the check data CD can be an error detecting signal such as CRC for all the data recorded in the main area.

Check
Data(+azimuth)=L0+R1+L2+R3------ -+R1439

Check
Data(-azimuth)=R0+L1+R2+L3------+L1439

The check data can be recorded in superimposed fashion in the word PC1 and other indefinite portions in the words PC2-PC7 to improve the reliability of the data. In this case, since one track has eight blocks of the first and second sub-code portions and there are seven packs available in a pair of EVEN and ODD blocks, it is possible to record maximally 56 sets of the check data CD in one track.

The check data is utilized in the following cases.

Upon reproduction, the check data read out from one track is compared with an exclusive OR of the main data read out from the main portion of the same track. If, as the result of this comparison, the data do not coincide with each other, it can be determined that the whole main area or the whole sub-area remains unerased (i.e. that the previously recorded check data CD also remains). On the other hand, if both data coincide with each other, it can be determined that the whole main area and the whole sub-area are either both correct or both are erroneous. Next, it can be detected which of the main area and the sub-area is erroneous by the use of the LFNO and AFNO in the following manner.

Figure 8:
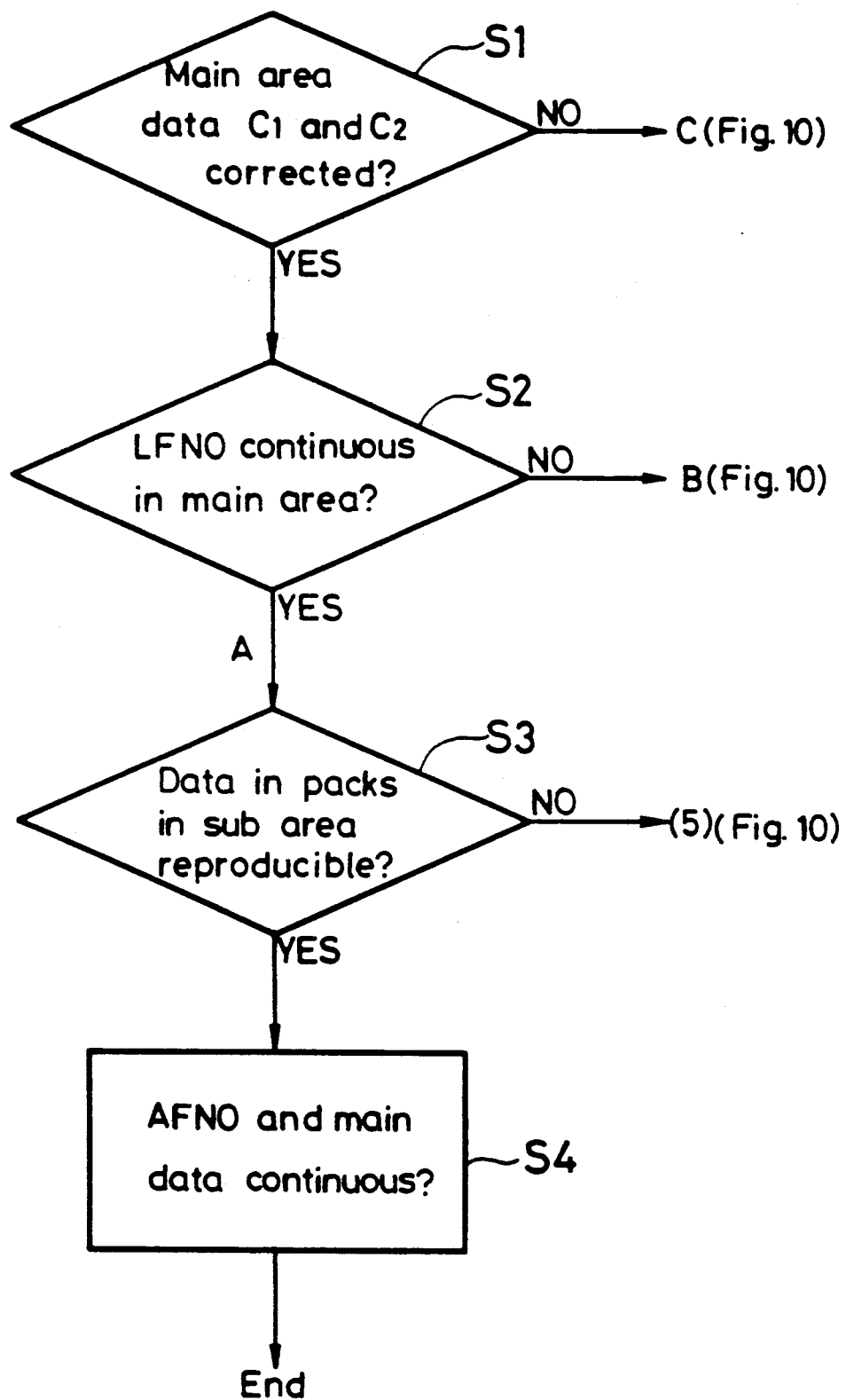
FIG. 8 is a flow chart showing a sequence of the error determining method.

FIG. 8 shows the sequence of such a determination, as carried out by the system controller 13, wherein the checking of items at steps S1–S4 provide the determination bases as shown in FIG. 9, from which errors can be defined as shown in FIG. 10.

In FIG. 8, it is first examined at step S1 whether or not data recorded in the main area (hereinafter simply called "the main data") was corrected by the codes $C_1$ and $C_2$. If the correction was not possible, it is determined on the basis of column C in FIG. 10 that there is a drop-out in the main data on the track, and a message indicative of the determination is transferred.

If it is detected at step SI that the correction was carried out, the process proceeds to the next step S2 to examine the continuity of the LFNO in the main area. If continuity is not found, it is determined on the basis of the column B in FIG. 10 that the overwrite was not correctly effected and hence unerased signals, which had been previously recorded, are reproduced, that is, a drop-in occurred in the concerned track, and a message indicative of the determination is transferred.

If continuity is found in the LFNO, the process terminates the check on the main area and proceeds to the next step S3 to check the sub-area. Specifically, the reproducibility of data in the packs of the sub-area is examined by the error correcting code $C_1$, the parities recorded in the packs, coincidence of data and so on. If these checks cannot be effected, it is determined on the basis of the row (5) in FIG. 10 that a drop-out occurred in data in the sub-area (sub-data) and the main data is correct.

If the reproducibility check has been effected, the process proceeds to the next step S4 wherein the continuity of the AFNO and the main data are checked, the latter by the use of the check data CD, and the determination bases shown in FIG. 9 are provided from the respective check results. Thus, the determinations in the column A of FIG. 10 can be obtained from the bases in FIG. 9.

The contents of respective determination are as follows:

A - (1) . . . . The main data is correct.

A - (2) . . . . Drop-in occurred in both of the main data and sub-data.

A - (3) . . . . Drop-in occurred in the main data. The AFNO was continuous eventually.

A - (4) . . . . Drop-in occurred in the sub-data. The AFNO is made to self-run and the main data is regarded to be correct.

A - (5) . . . . Drop-out occurred in the sub-data. The AFNO is made to self-run and the main data is regarded to be correct.

Incidentally, a flag can be generated when the drop-in is detected by the check data CD, whereby error correction can be effected by an error correction code ECC on the basis of this flag. Also, the above-mentioned error detection by the check data CD can be effected a plurality of times to prevent misreading of the check data CD and data in the main area.

According to the present invention, since the sub-area is provided with check data CD for all of the data in the main area of one track and the serial number AFNO of the frame, it is possible to easily detect errors such as a drop-in or the like which occur in the entire main area or the entire sub-area and specifically reveal the type of errors, whereby the performance of the DAT used as a data recorder can be highly improved.

The above description is given on a single preferred embodiment of the invention but it will be apparent that many modifications and variations could be effected by one skilled in the art without departing from the spirits or scope of the novel concepts of the invention so that the scope of the invention should be determined by the appended claims only.

We claim as our invention:

1. An apparatus for reproducing a digital signal containing main data, sub-data, and check data recorded in tracks formed on a recording medium, with each track having a main area in which is recorded the main data and a sub-area in which is recorded the sub-data and the check data for detecting an error in data recorded in said main area, the reproducing apparatus comprising:

means for reproducing the main data, the sub-data, and the check data recorded in the tracks formed on the recording medium, thereby generating reproduced main data, reproduced sub-data, and reproduced check data;

means for extracting said reproduced check data from the reproduced main data and the reproduced sub-data; and means for comparing the reproduced check data with the reproduced main data, and determining whether an error exists in the main data.

2. An apparatus for reproducing a digital signal according to claim 1 wherein the recorded digital data further includes a number indicative of a sequence of tracks recorded in said main area and an absolute number indicative of an absolute sequence of tracks recorded in said sub-area, and the apparatus for reproducing further comprises:

means for extracting the number indicative of the sequence of tacks recorded in said main area from the reproduced main data, the reproduced sub-data, and the reproduced check data;

means for detecting continuity of said number and generating a corresponding first signal indicative of the continuity of said number;

means for extracting the absolute number indicative of the absolute sequence of tracks recorded in said sub-area from the main data the sub-data and the check data;

means for detecting the continuity of said absolute number and generating a corresponding second signal; and means supplied with the reproduced check data, the first signal, and the second signal for error detecting the check data and detecting an error in one of the main data and the sub-data.

3. A method for reproducing a recorded digital signal containing main data, sub-data, and check data recorded in tracks formed on a recording medium, with each track having a main area in which is recorded the main data and a sub-area in which is recorded the sub-data and the check data for detecting an error in data recorded in said main area, the reproducing method comprising the steps of:

reproducing the main data, the sub-data, and the check data recorded in the tracks formed on the recording medium, thereby generating reproduced main data, reproduced sub-data, and reproduced check data; extracting said reproduced check data from the reproduce main data and the reproduced sub-data; and comparing the reproduced check data with the reproduced main data, and determining whether an error exists in the main data.

4. A method for reproducing a digital signal according to claim 3 wherein the recorded digital signal further includes a number indicative of a sequence of tracks recorded in said main area and an absolute number indicative of an absolute sequence of tracks recorded in said sub-area, and the method for reproducing further comprises the steps of:

extracting the number indicative of the sequence of tracks recorded in said main area from the reproduced main data, the reproduced sub-data, and the reproduced check data;

detecting continuity of said number and generating a corresponding first signal indicative of the continuity of said number;

extracting the absolute number indicative of the absolute sequence of tracks recorded in said sub-area from the reproduced signals;

detecting continuity of said absolute number and generating a corresponding second signal indicative of the continuity of said absolute number; and from the reproduced check data, the first signal, and the second signal, error detecting the check data and detecting an error in one of the main data and the sub-data.

5. An apparatus for recording and reproducing a digital signal containing main information data and sub-data to be recorded in tracks formed on a recording medium, comprising:

means for forming in each track a main area for recording the main information data and sub-area for recording the sub-data, and recording the main data in the main area and the sub-data in the sub-area, respectively;

means for generating check data for detecting an error in the data recorded in the main area and recording the check data in the sub-area of each track;

means for reproducing the main data, the sub-data, the check data recorded in the tracks formed on the recording medium thereby generating reproduced main data, reproduced sub-data, and reproduced check data;

means for extracting said reproduced check data from the reproduced main data and the reproduced sub-data; and means for comparing the reproduced check data with the reproduced main data and determining whether the reproduced check data is representative of the reproduced main data.

6. An apparatus for recording and reproducing a digital signal according to claim 5 wherein the recorded digital data is recorded in an absolute sequence with groups of tracks treated as units, and further includes a relative number indicative of a relative sequence of tracks within each unit recorded in said main area and an absolute number indicative of an absolute sequence of tracks recorded in said sub-area, and the apparatus for reproducing a digital signal further comprises:

means for extracting the relative number indicative of the sequence of tracks in a unit recorded in said main area from the reproduced main data, the reproduced sub-data, and the reproduced check data;

means for detecting whether tracks within a unit are in a desired order from said relative number and generating a corresponding first signal;

means for extracting the absolute number indicative of the absolute sequence of tracks recorded in said sub-area from the reproduced main data, the reproduced sub-data, and the reproduced check data;

means for detecting whether all of the tracks are in a desired order from said absolute number and generating a corresponding second signal; and means supplied with the reproduced check data, the first signal, and the second signal for error detecting the check data and thereby determining whether there is an error in one of the main data and the sub-data.

7. An apparatus for recording and reproducing a digital signal according to claim 6, wherein the means for reproducing the main data, the sub-data, and the check data includes a digital audio tape recorder (DAT).

8. A method for recording and reproducing a digital signal containing main information data and sub-data to be recorded in tracks formed on a recording medium, comprising the steps of:

forming in each track a main area for recording the main information data and a sub-area for recording the sub-data, and recording the main information data in the main area and the sub-data in the sub-area, respectively;

generating check data for each track for detecting an error in the data recorded in the main area and recording the check data in the sub-area of the track;

reproducing the main information data and sub-data recorded in the tracks formed on the recording medium thereby generating reproduced main information data and reproduced sub-data;

reproducing said check data recorded in said sub-data thereby generating reproduced check data; and comparing the reproduced check data with the reproduced main information data and determining whether the reproduced check data is representative of the reproduced main information data.

9. A method for recording and reproducing a digital signal according to claim 8 wherein the recorded digital signal is recorded in an absolute sequence with groups of tracks treated as units, and further includes a relative number indicative of a relative sequence of tracks within each unit recorded in said main area and an absolute number indicative of an absolute sequence of tracks recorded in said sub-area, and the method for reproducing a digital signal further comprises the steps of:

extracting the relative number indicative of the sequence of tracks in a unit recorded in said main area from the reproduced main information data, the reproduced sub-data, and the reproduced check data;

detecting whether the tracks within a unit are in a desired order from said relative number and generating a corresponding first signal;

extracting the absolute number indicative of the absolute sequence of tracks recorded in said sub-area from the reproduced main information data, the reproduced sub-data, and the reproduced check data;

detecting whether all of the tracks are in a desired order from said absolute number and generating a corresponding second signal; and from the reproduced check data, the first signal, and the second signal, error detecting the check data and thereby determining whether there is an error in one of the main data and the sub-data.

10. A method for recording and reproducing a digital signal according to claim 9, wherein the steps of reproducing the main information data, the sub-data, and the check data is carried out by a digital audio tape recorder (DAT).

11. An apparatus for reproducing a digital signal containing main data, sub-data, and check data recorded in an absolute sequence of tracks formed on a recording medium, with groups of tracks treated as units, each track having a main area in which is recorded the main data and a sub-area in which is recorded the sub-data and the check data for detecting an error in data recorded in said main area, and wherein the recorded digital data further includes a relative number indicative of a relative sequence of tracks within each unit recorded in said main area and an absolute number indicative of an absolute sequence of tracks recorded in said sub-area, comprising:

means for reproducing the main data and sub-data recorded in the tracks formed on the recording medium thereby generating reproduced main data and reproduced sub-data;

means for reproducing said check data recorded in said sub-area thereby generating reproduced check data;

means for comparing the reproduced check data with the reproduced main data to determine whether the check data is representative of the main data;

means for extracting the relative number indicative of the sequence of tracks in a unit recorded in said main area from the reproduced main information data, the reproduced sub-data, and the reproduced check data;

means for detecting whether the tracks within a unit are in a desired order from said relative number and generating a corresponding first signal;

means for extracting the absolute number indicative of the absolute sequence of tracks recorded in said sub-area from the reproduced main information data, the reproduced sub-data, and the reproduced check data;

means for detecting whether all of the tracks are in a desired order from said absolute number and generating a corresponding second signal; and means supplied with the reproduced check data, the first signal, and the second signal for error detecting the check data and thereby determining whether there is an error in one of the main data and the sub-data.

12. An apparatus for recording and reproducing a digital signal according to claim 11, wherein the means for reproducing the main data and the sub-data, and the means for reproducing the check data, include a digital audio tape recorder (DAT).

13. A method for reproducing a digital signal containing main data, sub-data, and check data recorded in an absolute sequence of tracks formed on a recording medium, with groups of tracks treated as units, each track having a main area in which is recorded the main data and a sub-area in which is recorded the sub-data and the check data for detecting an error in data recorded in said main area, and wherein the recorded digital data further includes a relative number indicative of a relative sequence of tracks within each unit recorded in said main area and an absolute number indicative of an absolute sequence of tracks recorded in said sub-area, comprising the steps of:

reproducing the main data and sub-data recorded in the tracks formed on the recording medium thereby generating reproduced main data and reproduced sub-data;

reproducing said check data recorded in said sub-area from the reproduced signals thereby generating reproduced check data;

comparing the reproduced check data with the reproduced main data and determining whether the check data is representative of the main data;

extracting the relative number indicative of the sequence of tracks in a unit recorded in said main area from the reproduced main data, the reproduced sub-data, and the reproduced check data;

detecting whether the tracks within a unit are in a desired order from said relative number and generating a corresponding first signal;

extracting the absolute number indicative of the absolute sequence of tracks recorded in said sub-area from the reproduced main data, the reproduced sub-data, and the reproduced check data;

detecting whether all of the tracks are in a desired order from said absolute number and generating a corresponding second signal; and from the reproduced check data, the first signal, and the second signal, error detecting the check data and thereby determining whether there is an a error in one of the main data and the sub-data.

14. A method for recording and reproducing a digital signal according to claim 13, wherein the steps of reproducing the main data, the sub-data, and the check data are carried out by a digital audio tape recorder (DAT).

* * * * *